3,277,146
CONTINUOUS MANUFACTURE OF MALONIC ACID DINITRILE
Kurt Sennewald, Knapsack, near Cologne, Klaus Born, Hermulheim, near Cologne, Alfred Hauser, Knapsack, near Cologne, Günter Viertel, Bruhl, near Cologne, and Winfried Lork, Friesheim, near Euskirchen, Germany, assignors to Knapsack-Griesheim Aktiengesellschaft, Knapsack, near Cologne, Germany, a corporation of Germany
No Drawing. Filed Nov. 23, 1964, Ser. No. 413,328
Claims priority, application Germany, Nov. 25, 1963, K 51,450
5 Claims. (Cl. 260—465.2)

The present invention is concerned with a process for the continuous manufacture of malonic acid dinitrile by subjecting cyanacetamide to thermal dehydration. Malonic acid dinitrile is a value feed product for making pharmaceutics and plastics materials.

It is known that cyanacetamide can be used as a feed product for making malonic acid dinitrile. As taught in U.S. Patents 2,459,128 and 2,389,217, the cyanacetamide is dehydrated by means of phosphorus oxychloride or phosphorus pentachloride in boiling ethylene chloride which serves as the solvent, common salt or sodium metabisulfite being added so as to avoid the formation of resinous by-products. The malonic acid dinitrile is obtained in a yield of 70–72% of the theoretical, calculated on the cyanacetamide used as the feed.

Phosphorus pentoxide which gives but small amounts of malonic acid dinitrile has also been suggested to be used as a dehydrating agent.

The above processes for dehydrating cyanacetamide are unsatisfatcory technically and commercially since in addition to the process product desired to be obtained they involve the formation by hydrolysis of acids, such as phosphoric acid and hydrogen chloride, which cannot be used again. Furthermore, these conventional processes are limited to discontinuous operation with relatively small batches and they imply adhering to the following conditions in order to obtain satisfactory yields:

(1) exclusion of water,
(2) exact maintenance of reaction temperature,
(3) continuous removal of resulting hydrogen chloride from the reaction mixture,
(4) fairly rapid discharge of the malonic acid dinitrile to arrest further action of the acid medium so as to obviate hydrolysis of the dinitrile.

Still further, in these conventional methods, the crude malonic acid dinitrile must be freed by expensive fractional distillation from hydrogen chloride and the phosphorous chlorides employed, which inevitably results in yield losses as high as 10% by weight.

It is also known that nitriles of aliphatic, α,β-unsaturated carboxylic acids can be prepared by subjecting α-oxycarboxylic acid amides to thermal treatment at a temperature of 400°–700° C. in the presence of inorganic acids, but the operating conditions used in this process when applied to the dehydration of cyanacetamide produce but minor yields of malonic acid dinitrile.

The present invention now provides a continuous process for the manufacture of malonic acid dinitrile by subjecting cyanacetamide to thermal treatment carried out in the presence of an acid catalyst, which obviates the disadvantages associated with the above conventional methods and resulting from the use of specific dehydrating agents which themselves are hydrolyzed and rendered useless by the water split off.

It has previously been held impossible to prepare malonic acid dinitrile by subjecting cyanacetamide to thermal dehydration because both the amide and the resulting dinitrile are known to constitute heat-sensitive compounds. Cyanacetamide, for example, is completely decomposed when distilled under normal conditions. Also malonic acid dinitrile increasingly splits off ammonia at 140° C., and vigorous decomposition reactions are observed during distillation at 220° C. at atmospheric pressure. It is therefore an especially unexpected result that the process of the present invention despite the high temperatures used therein, enables malonic acid dinitrile to be prepared in continuous manner and in good yields by subjecting cyanacetamide to thermal dehydration.

The process of the present invention substantially comprises heating and atomizing concurrently therewith feed components comprising cyanacetamide and phosphoric acid and/or the aqueous solution of an acid salt with phosphoric acid, alone or in combination, by means of a hot inert and oxygen-free gas stream having a temperature of about 900°–1400° C. in a heated reaction chamber, within fractions of a second, at a temperature of about 600°–1300° C., the heating and atomizing step resulting in the formation of a gas mixture; allowing the heating and atomized feed components to remain in the reaction chamber for a period of time of about 0.3 to 5 seconds; dehydrating the cyanacetamide at that temperature, cooling and liquefying the gas mixture leaving the reaction chamber by injecting a condensing liquid miscible or immiscible with malonic acid dinitrile, with the resultant formation of a condensate; isolating crude malonic acid dinitrile from the condensate by directly evaporating the condensing liquid or by extracting the malonic acid dinitrile with a suitable extracting agent followed by evaporation of the extracting agent, and ultimately purifying the isolated crude malonic acid dinitrile by distilling it under reduced pressure.

The acid catalyst solution recovered in the process of the present invention which contains the initially employed acid or acid salt in diluted form must be concentrated before it is being used again. The phosphoric acid used for dehydrating the cyanacetamide should be used in a concentration of about 60–90%, preferably 80–85%. If an acid salt of phosphoric acid, such as primary ammonium phosphate, is used as the dehydration catalyst, it should conveniently be employed in the form of an about 3–20% by weight aqueous solution.

An exemplary mode of executing the present process comprises preparing a saturated cyanacetamide solution in phosphoric acid and atomizing the said solution by means of a hot, oxygen-free inert gas into the reaction chamber. The inert gases used include carbon monoxide, carbon dioxide and gaseous hydrocarbons, such as methane or city gas and/or nitrogen, which spontaneously heat the feed mixture at the necessary reaction temperature, advantageously situated at about 800°–1000° C. The saturated cyanacetamide solution in phosphoric acid can be replaced with solutions containing about 10–40% by weight, preferably about 25–35% by weight, cyanacetamide. It is also possible to separately atomize the aqueous cyanacetamide solution and the acid catalyst solution into the reaction chamber and to allow the dehydrating reaction to proceed at the temperatures specified above.

The reaction chamber should be provided with an additional external heating means so as to ensure a uniform degree of temperature distribution therein. The devices of the type described in German Patents 1,069,614 and 1,113,216, for example, are suitable for use in carrynig out the process of the present invention.

In order to isolate the malonic acid dinitrile formed in the reaction chamber from the gaseous reaction mixture, the gases flowing off the reaction chamber are quenched and liquefied by injecting a condensing liquid. The resulting condensed matter has a temperature of about 10–20° C. Water or the aqueous reaction solution obtained during the condensing step is preferably used as the condensing liquid. In view of the fact that the malonic acid dinitrile dissolves partially in the resulting aqueous medium, it is convenient to further isolate the process product desired to be obtained by extracting it in countercurrent fashion with a suitable organic solvent. Methylene chloride and ethylene chloride are more especially used for this since they are miscible with malonic acid dinitrile in any desired mixing ratio, but fail to dissolve especially phosphoric acid. Furthermore, a relatively small proportion of solvent is required.

The aforementioned extracting step can be omitted provided that the water or the aqueous reaction solution used as the condensing liquid is replaced with a solvent capable of immediately dissolving malonic acid dinitrile. Methylene chloride or ethylene chloride is again useful for this.

The malonic acid dinitrile is then separated from the organic solvent by simple evaporation of the solvent, preferably under reduced pressure. Water which may have been entrained is expelled as an azeotrope. The crude malonic acid dinitrile remaining behind with an about 98% degree of purity is purified by being subjected to distillation under reduced pressure, and then has a melting point of about 31°–32° C.

As against conventional methods for making malonic acid dinitrile, the process of the present invention offers the advantage of permitting continuous operation. Furthermore, the phosphoric acid or the solution of a corresponding salt with that acid which is used for dehydrating the cyanacetamide can be concentrated and then employed again, which adds to the economy of the process. Still further, the malonic acid dinitrile obtained by the present process is distinguished by its high degree of purity which enables its being used especially for making pharmaceutical preparations.

*Example 1*

2.34 cubic meters/hr. (measured at N.T.P.) city gas were completely burned with 7.4 cubic meters/hr. (N.T.P.) air in a combustion chamber so as to produce an oxygen-free burned gas which was admixed with 3 cubic meters (N.T.P.) nitrogen and thereby cooled at a temperature of 1000° C. The hot gas was caused to flow under pressure through a perforated screen 12 mm. wide into a reaction chamber 80 cm. long, 24 cm. wide and lined with acid-proof bricks. 1230 grams/hr. of a 25% solution of cyanacetamide in 85% phosphoric acid was atomized concurrently therewith by means of the hot burned gas through the perforated screen into the reactor. At the reaction temperature of 860° C. obtained in the reactor, the cyanacetamide underwent dehydration resulting in the formation of malonic acid dinitrile. The reactor was additionally heated from the outside so as to maintain a uniform degree of temperature distribution over the overall length of the reactor. The reaction gases were allowed to remain in the reactor for about 2.5 seconds. At the reactor outlet, water was injected into the gaseous reaction mixture flowing off, which was thereby liquefied and quenched at a temperature of 10–20° C.

The malonic acid dinitrile was recovered from the aqueous phosphoric acid solution in continuous fashion by extracting it countercurrently with methylene chloride in a pulsating column having a perforated bottom. 4 liters solvent were used per liter of reaction solution. The methylene chloride was expelled and used again for extraction. The crude product obtained after a period of 13 hours was distilled under a pressure of 10 mm. mercury to yield 2027 grams pure malonic acid dinitrile melting at 31–32° C. The malonic acid dinitrile was obtained in a yield of 64.5% of the theoretical, calculated on the cyanacetamide used as the feed.

*Example 2*

2.11 cubic meters/hr. (N.T.P.) city gas were burned with 7 cubic meters/hr. (N.T.P.) air and with 1 cubic meter/hr. (N.T.P.) nitrogen and the resulting burned gas having a temperature of about 980° C. was introduced in a manner analogous to that described in Example 1 through the perforated screen into the reactor. 1134 grams/hr. of a solution consisting of 25% by weight cyanacetamide, 5% by weight primary ammonium phosphate and 70% by weight 85% phosphoric acid were atomized concurrently therewith by means of the hot burned gas and introduced through the perforated screen into the reactor. In the reaction chamber a temperature of 860° C. was obtained. After a time of stay of 3.2 seconds, the gaseous reaction mixture left the reaction chamber to be quenched at a temperature of 15°–20° C. with reaction mixture which had already been liquefied and cooled. From the resulting condensate the malonic acid dinitrile formed was extracted with ethylene chloride in the manner set forth in Example 1, and the extractant was evaporated to obtain crude malonic acid dinitrile. The crude product obtained after a period of 14 hours was distilled under a pressure of 20 mm. mercury and at a boiling temperature of 102° C. to yield 2092 grams pure malonic acid dinitrile. The yield was 66.6% of the theoretical, calculated on the amount of feed cyanacetamide.

*Example 3*

The cyanacetamide was dehydrated in a manner analogous to that described in Example 1, but 893 grams/hr. of an aqueous solution of 15.1% by weight cyanacetamide and 9.25% by weight primary ammonium phosphate were atomized by means of the hot gas stream into the reaction chamber. The reaction solution was worked up and pure malonic acid dinitrile was obtained in a yield of 46.7% of the theoretical, calculated on the amount of the cyanacetamide feed.

We claim:

1. A process for the continuous manufacture of malonic acid dinitrile from cyanacetamide, which comprises heating and atomizing concurrently therewith feed components comprising cyanacetamide and a member selected from the group consisting of phosphoric acid of 60–90% strength, and an aqueous solution of about 3–20% by weight of primary ammonium phosphate by means of a hot, inert gas stream free of gaseous oxygen having a temperature of about 900°–1400° C. in a heated reaction zone, at a temperature of about 700°–1300° C., the heating and atomizing step resulting in the formation of a gas mixture, allowing the feed components so heated and atomized to remain in the reaction zone for a period of time of about 0.3 to 5 seconds and dehydrating the cyanacetamide at that temperature, cooling and liquefying the gas mixture leaving the reaction chamber by injecting inert cooling liquid with the resultant formation of a condensate, isolating crude malonic acid dinitrile from the condensate, and purifying the isolated crude malonic acid dinitrile by distilling it under reduced pressure.

2. A process as claimed in claim 1 wherein a cyanacetamide solution in phosphoric acid containing about 10–40% by weight cyanacetamide is atomized.

3. A process as claimed in claim 1 wherein said member is primary ammonium phosphate.

4. A process as claimed in claim 1 wherein a member selected from the group consisting of methylene chloride, ethylene chloride and water is used as the inert cooling liquid.

5. A process as claimed in claim 1 wherein the inert gas is a member selected from the group consisting of carbon monoxide, carbon dioxide, a gaseous hydrocarbon and nitrogen.

References Cited by the Examiner

UNITED STATES PATENTS 2,389,217 11/1945 Surrey _____ 260—465.2
2,802,857 8/1957 Kesslin et al. _____ 260—465.2

CHARLES B. PARKER, *Primary Examiner.*

JOSEPH P. BRUST, *Assistant Examiner.*